United States Patent [19]

Hurst

[11] 4,210,831
[45] Jul. 1, 1980

[54] INVOLUTE LAMINATION ARMATURE FOR A LINEAR RECIPROCATING MOTOR

[75] Inventor: Ralph Hurst, Clifton Park, N.Y.
[73] Assignee: Exxon Enterprises, Inc., New York, N.Y.
[21] Appl. No.: 143
[22] Filed: Jan. 2, 1979
[51] Int. Cl.² ............................................. H02K 41/02
[52] U.S. Cl. ........................................ 310/13; 310/14; 310/23; 310/216
[58] Field of Search ............... 310/13, 14, 23, 24, 310/65, 42, 216, 217, 261, 264, 265

[56] References Cited

U.S. PATENT DOCUMENTS

| | | | |
|---|---|---|---|
| 3,182,216 | 5/1965 | Bancroft | 310/218 X |
| 3,840,983 | 10/1974 | Ryff | 310/265 X |
| 3,842,300 | 10/1974 | Daykin | 310/216 |
| 3,845,340 | 10/1974 | Brooks | 310/264 X |
| 3,886,383 | 5/1975 | Ross et al. | 310/216 X |
| 3,891,874 | 6/1975 | Roters et al. | 310/14 |

*Primary Examiner*—Mark O. Budd
*Attorney, Agent, or Firm*—Paul E. Purwin

[57] ABSTRACT

A generally cylindrical armature for a linear motor includes an outer diameter region of involute laminate construction. Restricting the laminate assembly to an outer diameter region of the armature, which region constitutes a high magnetic flux density region, minimizes an arc of involute $\alpha$. Minimizing the arc of involute $\alpha$ approximates more closely a true radial disposition of the involute laminations, thereby increasing the ability of the laminations to reduce eddy current losses, therein providing the basis for a more efficient linear motor.

16 Claims, 7 Drawing Figures

INVOLUTE LAMINATION ARMATURE FOR A LINEAR RECIPROCATING MOTOR

BACKGROUND OF THE INVENTION

The present invention relates to linear electrodynamic machines and more specifically to a generally cylindrical laminated armature of particular utility in the field of linear motors.

Generally, linear motors comprise an outer stator surrounding an inner core armature. Axially movement is provided to the armature by the energizing of alternating magnetic field coils. A major problem in achieving efficient linear reciprocating machines has been the attainment of an optimized flux pattern and minimized eddy current losses. When a conductor either moves through a nonuniform magnetic field or is in the region of changing magnetic flux, the electromagnetic forces are greater in one portion of the conductor than others, inducing circulatory currents within the conductor. These eddy currents circulate in such a manner as to oppose the motion of the conductor through the magnetic field. Eddy currents further produce a screening effect which inhibits the flux penetration into the conductor. In a linear motor, these eddy currents induced by the reciprocating motion of the armature through both nonuniform and changing magnetic fluxes results in energy losses in the form of undesired heating and deleterious aberrations in the magnetic flux. In attempts to solve this problem, armatures of laminate construction subdivide the electromagnetic forces among the laminates and substantially increases the path length of resistance to the reduced parasitic current.

In a generally cylindrical construction, which is an ideal configuration for a reciprocating motor armature, radially disposed laminations of equal thickness are necessarily situated closer at their inner radius as opposed to their outer radius. Such laminations produce a solid mass at the inner diameter, but are angularly separated at outer diameters. A means for circumferentially coupling laminations, such as spacers or deforming the outer edges to engage one another has been shown to be operative. A sample of such an armature may be found in U.S. Pat. No. 3,828,211. However, such designs increase the complexity and cost of constructing the armature. More importantly, such a design reduces magnetic susceptibility of the armature within the high field region producing a generally less efficient motor. Furthermore, such a design diminishes the physical integrity of the armature having a perforated rather than a solid laminated construction.

PRIOR ART

An alternative design utilizes laminations of the form of an involute of a circle, hereinafter referred to as involute laminations, in constructing a laminated core. One such an example may be found in U.S. Pat. No. 952,105. The problem encountered with constructing a cylindrical armature composed solely of involute laminations is that as the outer diameter of the laminated cylinder increases relative to the inner diameter, the angle subtended by the arc of involute also increases. For larger outer to inner diameter ratios, constructing an involute which subtends the appropriate angle becomes cost prohibitive since it is difficult to produce such involutes with conventional stamping techniques. In an attempt to alleviate this problem, the prior art has superimposed concentric cylinders of increasing outer diameter each composed of involute lamination. Examples of this design may be found in U.S. Pat. Nos. 3,205,826 and 952,105. Such construction inherently increases the complexity and cost of producing an armature.

An alternative approach, disclosed in U.S. Pat. No. 3,543,061, produces a laminate construction of two involute sections joined by an intermediate planar section. The disadvantages of such a lamination is that the total angle subtended by the arcs of involute remains large. In the design of an efficient reciprocating linear motor, the laminate should be as nearly radially disposed as possible to optimally interrupt the magnetic flux lines. The greater the deviation from a generally radial disposition, the greater the eddy current losses. Additionally, the prior art design provides for spacing between the planar portions of the lamination, which spacing constitutes susceptor voids in the flux path, reducing the armature's efficiency. It is therefore an object of the present invention to produce a generally cylindrical armature of involute laminations. The armature, though of laminate assembly, produces an essentially solid ferromagnetic susceptor in the outer diameter, high flux density region. The involute laminations are designed to reduce the arc of involute which results in minimizing eddy current losses.

It is a further object of the present invention to provide a composite solid and laminate armature optimally designed for use in a hybrid AC/DC linear motor.

SUMMARY OF THE INVENTION

The present invention generally contemplates an armature constructed of essentially uniform thickness involute laminations extending radially from and axially along a core plunger. According to the invention, the ratio of the outer to inner diameter of the laminate annular ring is optimized to provide an essentially solid laminate construction in the high flux density regions, while maintaining a generally radial disposition of each involute lamination. The armature produced according to the present invention substantially reduces eddy current losses resulting in higher motor efficiencies.

In addition, the present invention relates to the use of the aforementioned armature design in a hybrid AC/DC linear reciprocating motor wherein the composition of each region of the armature is specifically designed to compliment the type of magnetic field (i.e. either AC or DC) experienced by each such region during the typical operation of such a motor.

DETAILED DESCRIPTION OF THE DRAWINGS

DETAILED DESCRIPTION OF THE INVENTION

The present invention provides an improved armature, useful in linear motors, comprising a plurality of essentially uniform thickness involute laminations extending radially from and axially along a core plunger. An optimized area of the radial plane constituting the region of high magnetic flux density is intercepted by these laminations. A minimized arc of involute produced by reducing the ratio of the outer to inner diameters of the lamination assembly substantially reduces eddy current losses, resulting in a high efficiency linear motor.

Figure 1:
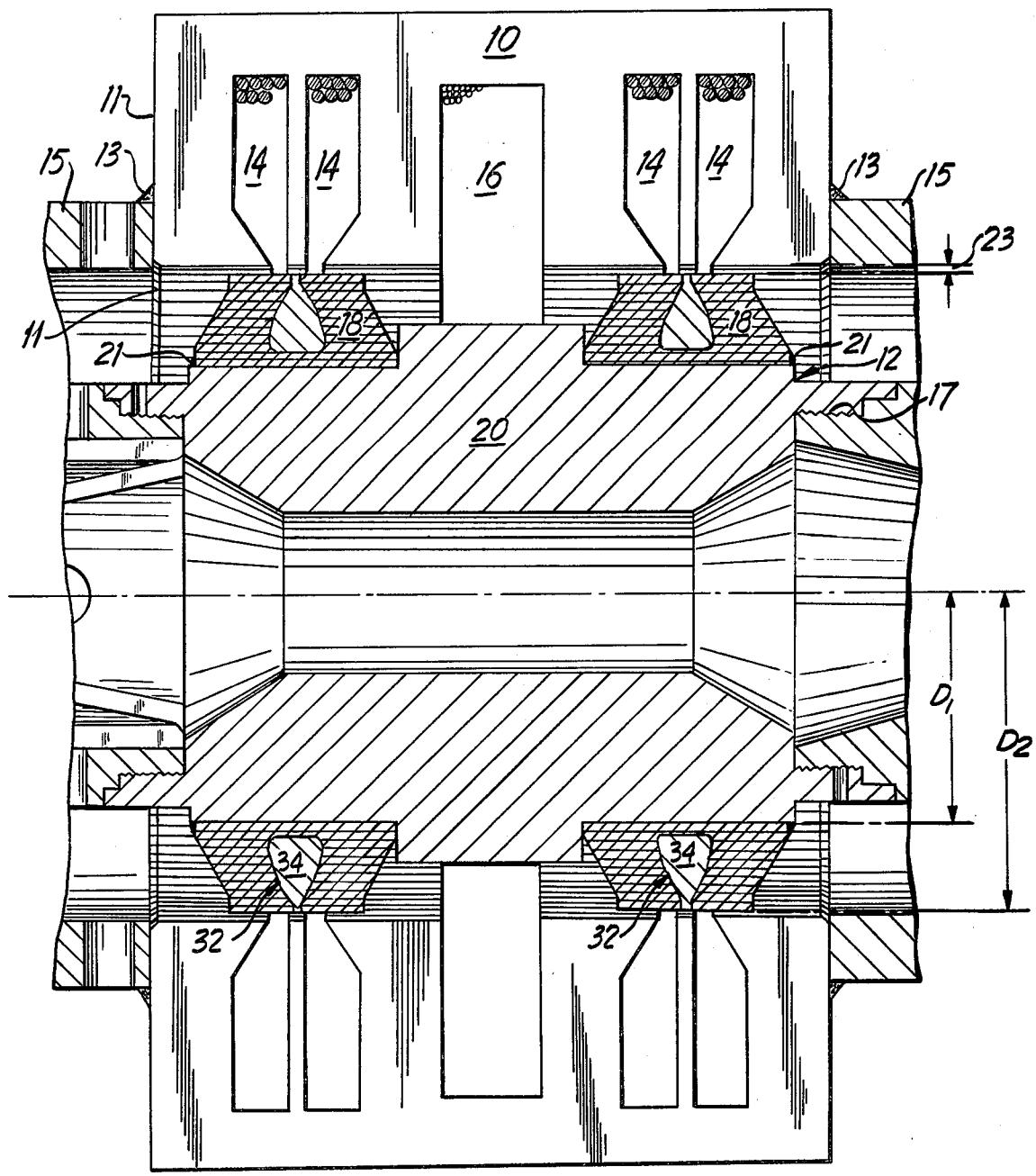
FIG. 1 is a cross sectional view of the armature of the present invention utilized in a linear reciprocating motor.

As illustrative thereof, in FIG. 1 a linear reciprocating motor, useful in driving compressors such as that described in U.S. Pat. No. 3,937,600, comprises a cylindrical outer stator body 10, surrounding an armature 12. The stator body 10 contains a plurality of AC electromagnetic coils 14, 14 and a central DC coil 16 radially disposed about the armature 12. The stator body 10 is preferably constructed from a plurality of laminations 11 which may be of the type shown in applicant's co-pending application Ser. No. 879,778 filed Feb. 21, 1978. The stator laminations 11 are secured by welds 13 to elements 15, 15 which in one application of applicant's linear motor may be associated parts of a reciprocating compressor (not shown). The armature comprises an annular laminate ring containing a plurality of uniform thickness involute laminations 18 extending radially from and axially along a solid (nonlaminate) core plunger 20. The laminations 18 are held in face-to-face contact, inwardly engaging said core 20 by means of a plurality of circumferential welds 21.

The armature 12 is urged to move in the axial direction upon applying an AC and DC electric current to the coils 14 and 16, respectively, producing changing electromagnetic fields in the region approximate to said involute laminations 18, and a constant magnetic field proximate to DC coil 16 and plunger 20.

Figures 2, 3:
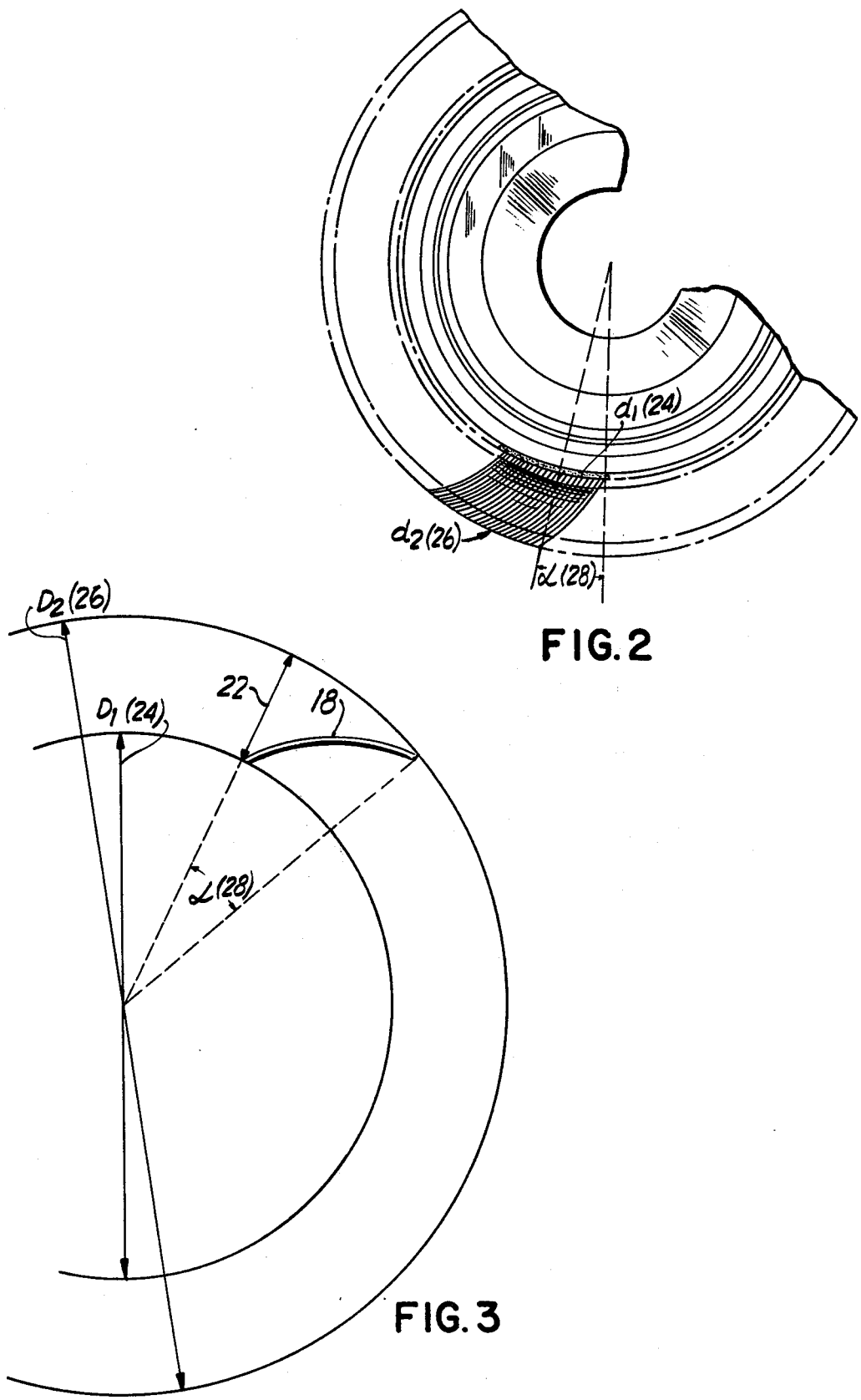
FIG. 2 is a partial end view of the armature of the motor of FIG. 1 illustrating the involute lamination.
FIG. 3 is an elarged end view of an individual involute lamination, illustrating the arc of involute $\alpha$.

Referring now to FIGS. 2 and 3, in accordance with the present invention, an involute lamination 18 extends a radial distance 22 from an inner diameter $D_1$ shown at 24 to an outer diameter $D_2$ shown at 26. To achieve an optimal reduction in eddy current losses, the laminate construction extends radially inward a distance 22 sufficient to intercept the region of high AC flux density adjacent to the AC stator coils 14 shown in FIG. 1. The inward radial extension of the laminate construction is held to a minimum to reduce the angle $\alpha$ 28 subtended by the arc of an individual involute. In keeping with the object of the present invention, the involute laminations so constructed most closely resembles a true radial disposition, which represents an ideal construction in a generally cylindrical armature. Concurrently the laminate construction extends radially inward a sufficient distance to effectively suppress and reduce eddy currents.

Figure 4:
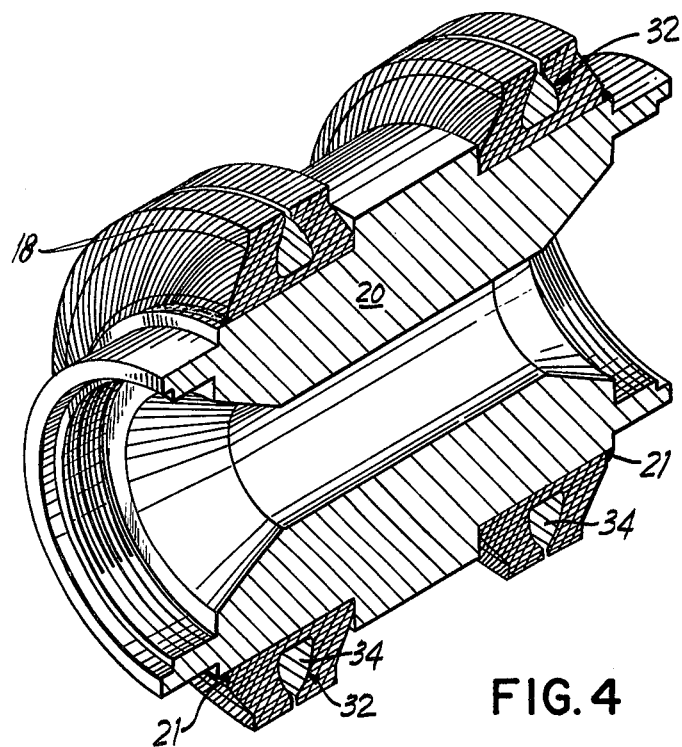
FIG. 4 is a cutaway view in perspective of the preferred armature of the present invention.
Figure 4A:
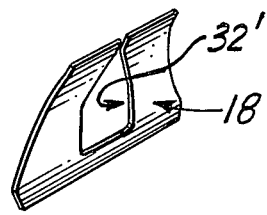
FIG. 4A is a view in perspective of an individual lamination of FIG. 4.

Referring now to FIGS. 4 and 4A, each involute lamination 18 is constructed of a ferromagnetic material such as silica steel, cold-rolled steel or similar such material. The faces of the laminations may be coated with or treated by any of a number of means known in the art to provide a dielectric layer between laminations. The involute laminations are fabricated by conventional techniques such as stamping, die forming or similar methods. Each lamination is provided with an endwardly extending slot 32' whereby stacking the plurality of laminations into the generally cylindrical configuration of the armature, the slots form an annular groove 32. A shorting or compensating coil 34 comprising a conductor such as copper or aluminum, situated in said annular groove 32, further compensates induced eddy currents. In a preferred embodiment of the invention the coil 34 is formed by die casting aluminum in the groove 32 while holding the laminations in a suitable jig. The laminations thus held by the cast aluminum coil 34, may be suitable bonded to the core plunger 20 by a plurality of circumferential welds 21, forming an essentially solid and generally cylindrical armature having a laminate construction in the region approximate to the AC electromagnetic coil.

Referring again to FIG. 1, in a preferred embodiment of the present invention, the laminate assembly extends axially only to the region proximate to the AC field generated by coils 14, 14 at either end of the stator 10 and extends radially inward from an outer diameter $D_2$ shown at 26 in close adjacency to the magnetic coils 14, to an inner diameter $D_1$ shown at 24 which constitutes the region of high flux density. In so selecting a reduced ratio of the outer to inner diameter of the involute lamination the radial angle subtended by the arc of involute is minimized. The suppression characteristics of laminations are enhanced as the lamination approaches a more truly radial disposition. In other words, it is desirable to keep the inner diameter of the involute laminations as large as possible so that each lamination 18 deviates as little as possible from a true radial plane. Therefore, in accordance with one aspect of the present invention, the radial angle substended by the arc of involute is less than about 45° and preferably as low as 20°.

A solid (non-laminate) ferromagnetic construction is preferred in the region proximate to the DC field generated by stator coil 16. Accordingly, in the embodiment of FIG. 1, the assembly of the involute lamination 18 extend axially only to that region of the core 20 which is proximate to the AC coils 14. In the region proximate to the DC coil 16 the ferromagnetic core 20 extends radially outward to a region in close adjacency to the inward surface of the DC coil 16. A peripheral clearance 23 segregates the electromagnetic coils 14, 14 from the armature 12 and particularly from the laminations outer surface. Although not illustrated, the radial position of the armature 12 is maintained relative to the stator body 10 by conventional axial bearings, collars, piston sleeves or the like engaging either the armature itself or an externally affixed axial extension of the armature, such as the pistons and cylinders of a compressor as shown for instance in U.S. Pat. No. 3,937,600.

As noted earlier, the individual laminations are a ferromagnetic metal such as cold rolled steel, silica steel or similar such material. The atypical use of cold rolled steel has not been determined to be detrimental to the armature performance when embodied in a preferred hybrid AC/DC linear motor design described heretofore. The involute laminate 18 having slots 32 extending to the outer surface of the laminate contain an annular compensation coil 34 constructed of cast aluminum. The annular shorting coil serves both to reduce eddy current losses and serves to mechanically secure the individual laminations in a toroidal sub-assembly prior to their attachment to the core 20 by the circumferential welds 21.

The application of an alternating current to AC electromagnetic coils 14, 14 and a direct current to DC electromagnetic coil 16, the resulting electromagnetic forces, and the operation of the armature 12 produces a reciprocating linear motor whose principal of operation is described in detail in U.S. Pat. No. 3,891,874, which is herein incorporated by reference.

Although not illustrated, it may be realized that the armature 12 is adapted to provide symmetric reciprocating axial movement for a linear driven machine. In a preferred embodiment, the present invention may be employed in a linear compressor of the type disclosed and claimed in U.S. Pat. No. 3,937,600. Means for interconnecting the armature 12 of the motor to the machine to be driven, here illustrated in FIG. 1 as a threaded collar 17, may comprise any conventional engaging or motion translating mechanism.

Figure 5:
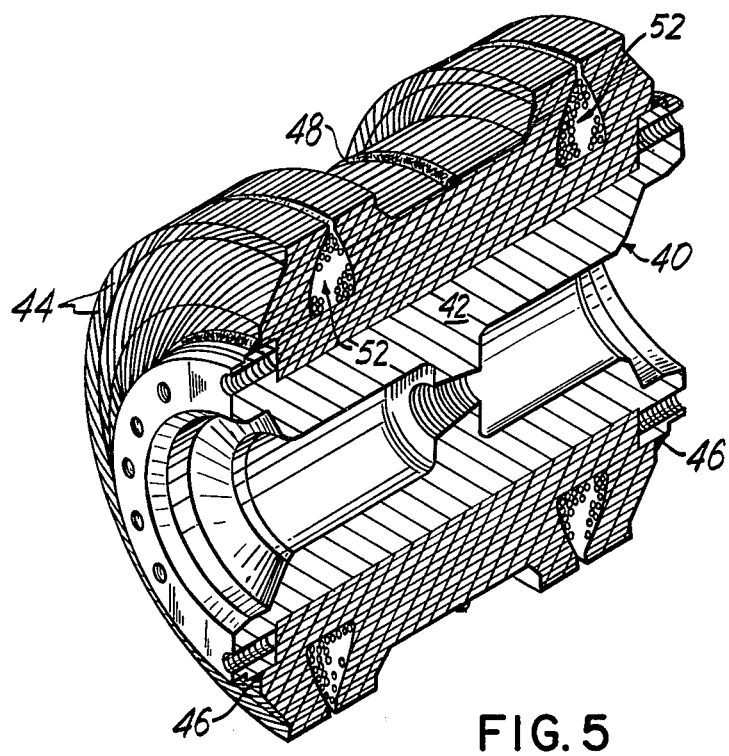
FIG. 5 is a cutaway view in perspective of an alternate embodiment of the armature according to the present invention.
Figure 5A:
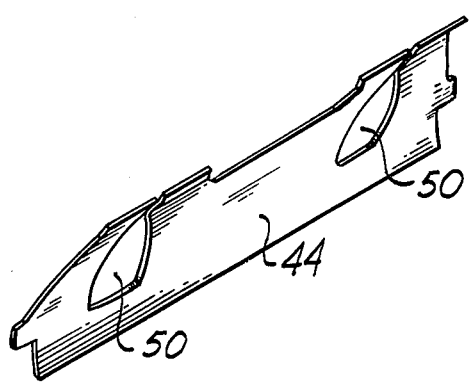
FIG. 5A is a perspective view of an individual involute lamination.

The embodiment of the invention which is illustrated in FIGS. 5 and 5a is similar to that of FIG. 1 except for the construction of the laminations. Thus, FIG. 5 shows an armature 40 comprising a central core plunger 42 and a plurality of radially disposed involute laminations 44 extending axially along said core 42. The contacting involute laminations 44 are bonded to one another and to the core 42 by end circumferential welds 46 and a central circumferential weld 48. As is apparent in FIGS. 5 and 5a, each of the involute laminations 44 singularly extend for the majority of the axial distance of the core plunger 42. Each lamination 44 is provided with a pair of slots 50 which form an annular groove upon stacking said laminations into a generally cylindrical configuration. A compensating coil 52 comprising a plurality of shorted conductor turns of copper wire situated in each of the annular grooves. This compensating coil reduces eddy current losses in the same fashion as that accomplished by the cast aluminum compensating coil 34 of FIG. 1.

Although not illustrated, it may be realized that the armatures of both FIG. 1 and FIG. 5 are adapted to provide symmetric reciprocating axial movement to a linear driven machine. In a preferred embodiment, the present invention may be employed in a linear compressor of the type disclosed and claimed in U.S. Pat. No. 3,937,600. Means for interconnecting the armature in the machine to be driven, here illustrated as threaded holes, may comprise any conventional engaging or motion translating mechanism. Although the invention has been illustrated and described particularly in use with a linear compressor, the linear motion provided by the armature may be translated to circular motion or employed in a machine adapted to require a linear driven force.

In accordance with the teaching of this invention, the outer to inner diameter ratio of the laminate assembly is minimized for each particular embodiment to reduce the angle substended by the arc of involute, resulting in a more truly radial disposition of the laminations. In the generally cylindrical armature of this invention, the eddy current suppression is enhanced by minimizing the angular deviation of the laminations. The armature of the present invention minimizes induced eddy losses without sacrificing the armatures magnetic susceptibility by providing a laminate construction on the region proximate to the alternating field. The geometric shape of the laminations (i.e. involute of a circle) provides an essentially solid ferromagnetic core armature free from subceptor voids in the high flux density region. The combined minimizing of eddy current losses and the increased magnetic susceptor in high flux density regions provide a more efficient armature for use in linear motors.

What is claimed is:

1. An improved armature for a linear motor comprising a generally cylindrical core of homogeneous non-laminate ferromagnetic material and at least one annular ring of involute laminations surrounding said core and secured thereto each said lamination being in the form of an involute and extending radially from and axially along said core to provide an essentially solid cylindrical armature having an outer region of laminate construction.

2. The armature set forth in claim 1 wherein the inner diameter of each of said annular rings is relatively large in relation to the outer diameter of said armature to thereby minimize the arc of involute and provide minimum angular deviation of the laminations from a true radial disposition.

3. The armature of claim 2 wherein the angular deviation is less than about 40°.

4. The armature of claim 2 wherein the angular deviation is less than about 20°.

5. The armature set forth in claim 1 wherein said annular ring of laminations includes at least one annular slot and an electroconductive coil in said slot.

6. The armature set forth in claim 5 wherein said coil is die cast in said slot and serves to hold said ring of laminations in place prior to securing said ring to said core.

7. The armature set forth in claim 1 wherein the involute laminations have a surface comprising a thin dielectric layer.

8. An efficient linear motor of hybrid AC/DC configuration comprising:
an outer stator member containing a plurality of axially spaced AC electromagnetic coils and at least one DC electromagnetic coil, a generally cylindrical armature situated within said stator which armature includes at least one annular ring of involute laminations extending radially from and axially along a monlaminate core to which core said involute laminations are secured.

9. The linear motor set forth in claim 8 wherein the involute laminations extend axially only to a region proximate to said AC electromagnetic coils.

10. The linear motor set forth in claims 8 or 9 wherein the involute laminations extend radially from an inner diameter contiguous to said core outwardly to an outer diameter adjacent to the inwardly facing surface of the AC coils.

11. The linear motor set forth in claim 10 wherein the involute lamination is constructed of a material comprising cold rolled steel.

12. The linear motor set forth in claim 8 wherein said involute laminations have a surface comprising a thin dielectric layer.

13. The linear motor set forth in claim 8 wherein the inner diameter of each of said annular rings of said armature is relatively large in relation to the outer diameter of said armature to thereby minimize the arc of involute and provide minimum angular deviation of the laminations from a true radial disposition.

14. The armature set forth in claim 8 wherein the generally solid ferromagnetic core extends radially outward to a point adjacent to said DC coils throughout the axial dimension of the DC coils.

15. The armature of claims 8 or 15 wherein the dynamic mass of the core plunger is reduced by means of hollowing said plunger.

16. The linear motor set forth in claim 8 wherein said stator contains two axially disposed AC electromagnetic coils and one DC electromagnetic coil and the armature contains two annular rings of involute laminations axially disposed alike that of the stator AC electromagnetic coils.

* * * * *